(12) United States Patent
Ichihara (10) Patent No.: US 7,505,078 B2
(45) Date of Patent: Mar. 17, 2009

(54) CAMERA SYSTEM, STROBOSCOPIC DEVICE, METHODS OF CONTROLLING THE CAMERA SYSTEM AND STROBOSCOPIC DEVICE, PROGRAM, AND STORAGE MEDIUM

(75) Inventor: Yoshiro Ichihara, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 11/093,330

(22) Filed: Mar. 29, 2005

(65) Prior Publication Data

US 2005/0219405 A1    Oct. 6, 2005

(30) Foreign Application Priority Data

Mar. 30, 2004  (JP)  ............................. 2004-099728
Mar. 30, 2004  (JP)  ............................. 2004-099729

(51) Int. Cl.
    H04N 5/222   (2006.01)
    H04N 5/262   (2006.01)
    H04N 5/232   (2006.01)
    H04N 5/235   (2006.01)

(52) U.S. Cl. .................. 348/370; 348/240.99; 348/345; 348/362

(58) Field of Classification Search ................. 348/370, 348/371, 345, 240.99, 362
    See application file for complete search history.

(56) References Cited

U.S. PATENT DOCUMENTS

| | | | | |
|---|---|---|---|---|
| 5,848,302 | A * | 12/1998 | Machida ....................... | 396/60 |
| 5,892,987 | A * | 4/1999 | Ohmori ........................ | 396/61 |
| 5,895,128 | A * | 4/1999 | Kishimoto et al. ............ | 396/61 |
| 6,091,902 | A * | 7/2000 | Komatsuzaki et al. ......... | 396/60 |
| 6,359,651 | B1 * | 3/2002 | Yokonuma ................... | 348/370 |
| 2001/0010561 | A1 * | 8/2001 | Nagai ........................ | 348/371 |
| 2004/0119878 | A1 * | 6/2004 | Okamura .................... | 348/371 |

FOREIGN PATENT DOCUMENTS

| | | |
|---|---|---|
| JP | 5-11315 | 1/1993 |
| JP | 5-11315 A | 1/1993 |
| JP | 5-313230 | 11/1993 |
| JP | 5-313230 A | 11/1993 |
| JP | 6-11760 | 1/1994 |
| JP | 6-11760 A | 1/1994 |
| JP | 8-6120 | 1/1996 |
| JP | 8-6120 A | 1/1996 |

OTHER PUBLICATIONS

English Abstract for Japanese Patent Publication No. 5-11315.
English Abstract for Japanese Patent Publication No. 5-313230.
English Abstract for Japanese Patent Publication No. 6-11760.
English Translation of Japanese Patent Publication No. 8-6120.

* cited by examiner

*Primary Examiner*—Nhan T. Tran
*Assistant Examiner*—Trung Diep (57) ABSTRACT

A camera system includes a stroboscopic device (1) and camera (2). The camera (2) includes an information output unit which outputs, to the stroboscopic device (1), focal length information of a photographing lens, and size information indicating a magnification with respect to a reference size of an exposure surface of an image sensing element. The stroboscopic device (1) includes an irradiation angle changing unit (8) which changes the irradiation angle of strobe light, an information input unit (9) which receives the focal length information and size information from the camera (2), and a control unit (9) which sets the irradiation angle at a wide angle, if the product of the focal length and magnification is in the middle of a reference focal length range.

8 Claims, 10 Drawing Sheets

CAMERA SYSTEM, STROBOSCOPIC DEVICE, METHODS OF CONTROLLING THE CAMERA SYSTEM AND STROBOSCOPIC DEVICE, PROGRAM, AND STORAGE MEDIUM

FIELD OF THE INVENTION

The present invention relates to a stroboscopic device attached to (incorporated in) a camera and having a function of changing the irradiation angle of irradiating light, and a camera system.

BACKGROUND OF THE INVENTION

As a conventional stroboscopic device, a zoom strobe capable of changing the irradiation angle in accordance with the focal length of a lens, i.e., the photographing angle of view has been put into practical use. In addition, a zoom strobe by which a camera outputs focal length information of an attached lens to a stroboscopic device, and, on the basis of this information, the stroboscopic device automatically changes and sets the irradiation angle to an optimum value has been put into practical use.

When the irradiation angle is to be automatically set to an optimum value on the basis of focal length information of a lens, it can be unconditionally done if the aperture size of a camera to which this stroboscopic device is attached is always constant. If this is not the case, i.e., if the stroboscopic device can also be attached to a camera having a different aperture size, the irradiation angle cannot be simply set to an optimum value on the basis of only the focal length information of the lens.

The irradiation angle of a stroboscopic device must be determined in accordance with the photographing angle of view. Therefore, when a stroboscopic device is attachable to cameras different in frame size, the irradiation angle cannot be set to an optimum value on the basis of only focal length information of a lens.

To solve this problem, a method by which a camera. outputs focal length information of a lens and frame size information of the camera, and the irradiation angle of a strobe is adjusted on the basis of these pieces of information is proposed (e.g., Japanese Patent Laid-Open No. 8-6120).

In another method (e.g., Japanese Patent Laid-Open No. 5-313230), the movement and light distribution angle of a strobe light-emitting portion are changed in accordance with the width and moving velocity of a shutter slit so that a stroboscopic device which emits light in synchronism with the start of exposure of a focal-plane shutter irradiates only the region of an object to be photographed in the region of the slit width, thereby emitting light by effectively using the overall light amount of the strobe.

In still another method (e.g., Japanese Patent Laid-Open No. 6-11760), the strobe irradiation angle can be selected in accordance with the focal length of a lens, so a photographer can easily get a photographing image because he or she can set the irradiation angle before photography.

In still another method (e.g., Japanese Patent Laid-Open No. 5-11315), if no focal length information of a lens is obtained, a photographing failure caused by vignetting of distributed light is prevented by forcedly changing the irradiation angle of a strobe to a wide angle.

In Japanese Patent Laid-Open No. 8-6120, a correct strobe light distribution angle is set by transmitting focal length information of a lens and image size information from the camera to the stroboscopic device. However, if the number of variable steps of the strobe irradiation angle increases, the process of conversion from the focal length and image size into the light distribution angle performed by arithmetic processing in the stroboscopic device is complicated.

In Japanese Patent Laid-Open No. 5-313230, operation coefficients are preset in the strobe, and an operation is performed by finding an operation coefficient from the image size. However, since the movement and light distribution angle of the strobe light-emitting portion are changed in accordance with the width and moving velocity of the shutter slit so that the stroboscopic device which emits light in synchronism with the start of exposure of the focal-plane shutter irradiates only the region of an object to be photographed in the region of the slit width, the mechanism is complicated, and the tracking control of synchronous communication when the shutter speed is high is a problem.

In Japanese Patent Laid-Open No. 6-11760, a photographer can easily get a photographing image by setting the strobe irradiation angle before photography. However, the user himself or herself must manually change the light distribution angle.

In Japanese Patent Laid-Open No. 5-11315, if no focal length information of a lens is obtained, a photographing failure caused by vignetting of distributed light is prevented by forcedly changing the irradiation angle of the strobe light to a wide angle. However, the irradiation angle is not particularly changed in accordance with a difference between aperture sizes.

Furthermore, a system in which a plurality of stroboscopic devices are arranged around an object, and light emission and the like of these devices are controlled by wireless transmission/reception is recently proposed.

In this system, for example, a stroboscopic device attached to a camera is a master strobe, and other stroboscopic devices are slave strobes. Appropriate stroboscopic photography of an object can be performed by adjusting the light amounts of the slave strobes by a transmission signal from the master strobe. Since the irradiation angle of each slave strobe is desirably set at a wide angle so that an object is well irradiated with light, this irradiation angle is automatically set at a wide angle in the slave mode.

Unfortunately, if the master strobe is detached from the camera and used as a slave strobe, the last-set irradiation angle sometimes remains because the last settings cannot be canceled.

SUMMARY OF THE INVENTION

The present invention has been made in consideration of the above situation, and has as its object to provide a stroboscopic device and camera system capable of always adjusting the irradiation angle of irradiating light to an optimum value, and also capable of accurately displaying set information of a camera.

To solve the above problems and achieve the above object, the present invention is a camera system including a stroboscopic device and camera, wherein the camera comprises information output unit which outputs, to the stroboscopic device, focal length information of a photographing lens, and size information indicating a magnification with respect to a reference size of an exposure surface of an image sensing element, and the stroboscopic device comprises irradiation angle changing unit which changes an irradiation angle of strobe light, information input unit which receives the focal length information and size information from the camera, and control unit which sets the irradiation angle at a wide angle, if a product of the focal length and magnification is in a middle of a reference focal length range.

The present invention is a stroboscopic device attachable to a camera, comprising irradiation angle changing unit which changes an irradiation angle of strobe light, information input unit which receives, from a camera to which the stroboscopic device is attached, focal length information and size information indicating a magnification with respect to a reference size of an exposure surface of an image sensing element, and control unit which sets the irradiation angle at a wide angle, if a product of the focal length and magnification is in a middle of a reference focal length range.

The present invention is a camera system including a stroboscopic device and camera, wherein the camera comprises information output unit which outputs, to the stroboscopic device, focal length information of a photographing lens, and size information indicating a magnification with respect to a reference size of an exposure surface of an image sensing element, and the stroboscopic device comprises irradiation angle changing unit which changes an irradiation angle of strobe light, information input unit which receives the focal length information and size information from the camera, and control unit capable of operating in a first mode in which the irradiation angle of the strobe light is controlled on the basis of the focal length information and size information, and a second mode in which light emission is controlled on the basis of an instruction from another stroboscopic device, and, in the second mode, for setting the irradiation angle of the strobe light to a predetermined value by inhibiting the first mode.

The present invention is a stroboscopic device attachable to a camera, comprising irradiation angle changing unit which changes an irradiation angle of strobe light, information input unit which receives, from a camera, focal length information and size information indicating a magnification with respect to a reference size of an exposure surface of an image sensing element, and control unit capable of operating in a first mode in which the irradiation angle of the strobe light is controlled on the basis of the focal length information and size information, and a second mode in which light emission is controlled on the basis of an instruction from another stroboscopic device, and, in the second mode, for setting the irradiation angle of the strobe light to a predetermined value by inhibiting the first mode.

The present invention is a method of controlling a camera system including a stroboscopic device and camera, wherein the camera comprises an information output step of outputting, to the stroboscopic device, focal length information of a photographing lens, and size information indicating a magnification with respect to a reference size of an exposure surface of an image sensing element, and the stroboscopic device including irradiation angle changing unit which changes an irradiation angle of strobe light comprises an information input step of receiving the focal length information and size information from the camera, and a control step of setting the irradiation angle at a wide angle, if a product of the focal length and magnification is in a middle of a reference focal length range.

The present invention is a method of controlling a stroboscopic device having irradiation angle changing unit which changes an irradiation angle of strobe light and attachable to a camera, comprising an information input step of receiving, from a camera to which the stroboscopic device is attached, focal length information and size information indicating a magnification with respect to a reference size of an exposure surface of an image sensing element, and a control step of setting the irradiation angle at a wide angle, if a product of the focal length and magnification is in a middle of a reference focal length range.

The present invention is a method of controlling a camera system including a stroboscopic device and camera, wherein the camera comprises an information output step of outputting, to the stroboscopic device, focal length information of a photographing lens, and size information indicating a magnification with respect to a reference size of an exposure surface of an image sensing element, and the stroboscopic device including irradiation angle changing unit which changes an irradiation angle of strobe light comprises an information input step of receiving the focal length information and size information from the camera, and a control step in which an operation can be performed in a first mode in which the irradiation angle of the strobe light is controlled on the basis of the focal length information and size information, and a second mode in which light emission is controlled on the basis of an instruction from another stroboscopic device, and, in the second mode, the irradiation angle of the strobe light is set to a predetermined value by inhibiting the first mode.

The present invention is a method of controlling a stroboscopic device having irradiation angle changing unit which changes an irradiation angle of strobe light and attachable to a camera, comprising an information input step of receiving, from a camera to which the stroboscopic device is attached, focal length information and size information indicating a magnification with respect to a reference size of an exposure surface of an image sensing element, and a control step in which an operation can be performed in a first mode in which the irradiation angle of the strobe light is controlled on the basis of the focal length information and size information, and a second mode in which light emission is controlled on the basis of an instruction from another stroboscopic device, and, in the second mode, the irradiation angle of the strobe light is set to a predetermined value by inhibiting the first mode.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail below in accordance with the accompanying drawings.

Figure 1:
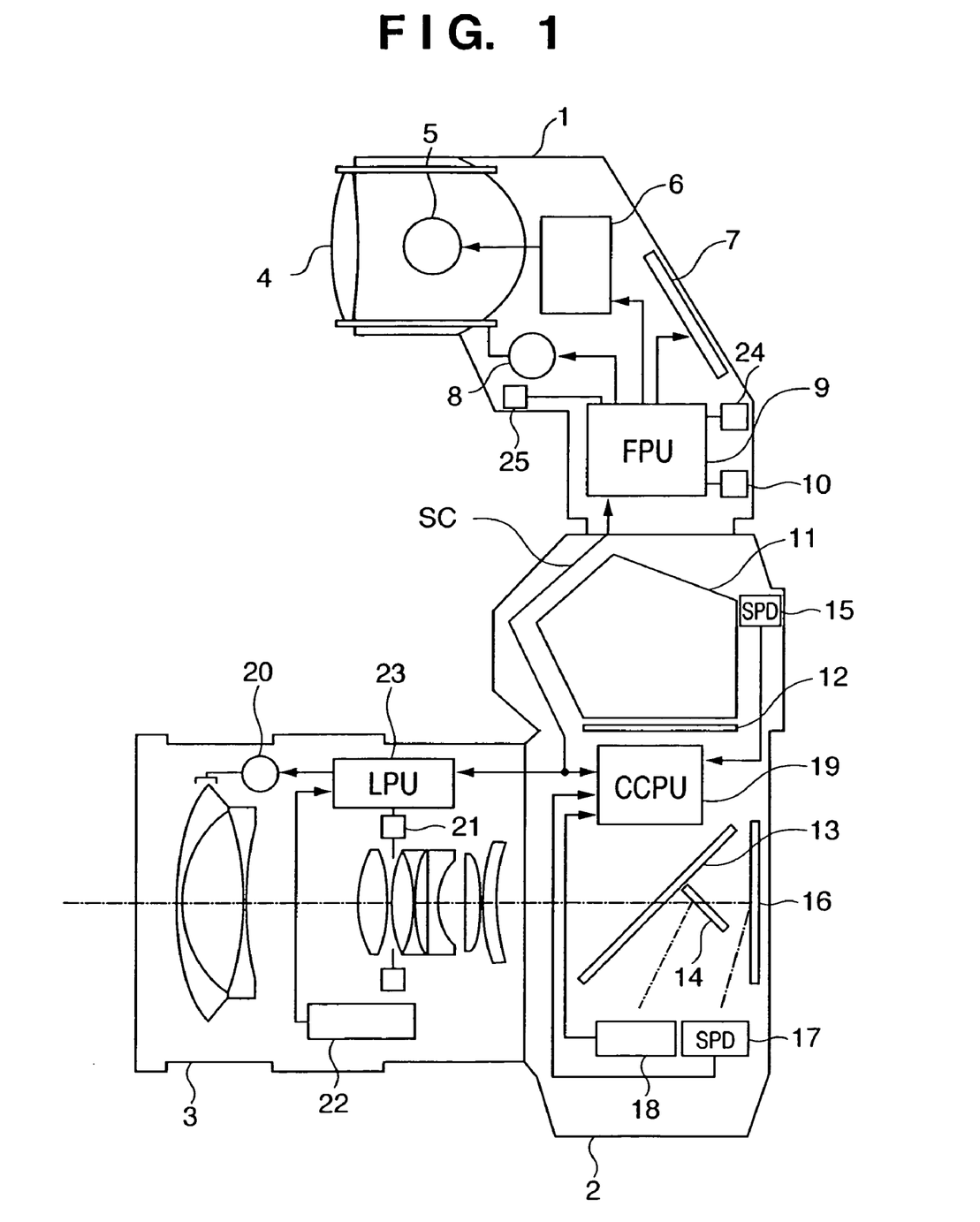
FIG. 1 is a view showing an outline of the mechanism and the circuit blocks of a camera and a stroboscopic device attached to the camera applied as an embodiment according to the present invention.

FIG. 1 is a view showing an outline of the mechanism of a camera system, a camera, and a stroboscopic device attached to the camera applied as an embodiment according to the present invention.

In FIG. 1, reference numeral 1 denotes a stroboscopic device; 2, a camera; and 3, a lens.

The stroboscopic device 1 is detachably attached to or incorporated into the camera 2. The stroboscopic device 1 contains a condenser lens 4, a luminous element 5 such as a xenon lamp, a boosting circuit 6 which boosts the voltage of a battery (not shown) to a voltage level necessary for light emission of the luminous element 5, a display device 7 which displays the set conditions of a strobe by using, e.g., an LCD and LED, an irradiation angle adjusting motor (irradiation angle changing unit/step) 8 which changes the irradiation angle of irradiating light by moving the condenser lens 4, and a strobe control microcomputer (to be referred to as an FPU hereinafter) 9 which connects to the boosting circuit 6, display device (display unit/step) 7, irradiation angle adjusting motor 8, and the like, and controls them in accordance with predetermined programs.

The FPU (control unit/step, information input unit/step) 9 has, e.g., a one-chip IC circuit configuration with a built-in microcomputer, which includes a CPU, ROM, RAM, input/output control circuit (I/O control circuit), multiplexer, timer circuit, and the like, and can control the camera system by determining conditions by software. Note that the FPU 9 may also contain an EEPROM 10 described below.

The EEPROM (a ROM which allows electrical data erase and write) 10 is connected to the FPU 9. Setting information necessary for a strobe operation is written in the EEPROM 10. The EEPROM 10 is a nonvolatile memory which keeps storing data even when the power supply is turned off.

The camera 2 incorporates an optical system, photoelectric conversion devices 15 and 17, a focusing photoelectric conversion device 18, sensor elements of the focusing photoelectric conversion device 18, and a camera control microcomputer (to be referred to as a CCPU hereinafter) 19. The optical system includes a pentagonal prism 11, focusing screen 12, main mirror 13, and sub mirror 14. The photoelectric conversion device 15 acquires luminance information of an object in order to control exposure. The photoelectric conversion device 17 acquires light amount information of a film surface 16 in order to control the light emission amount of the stroboscopic device. The focusing photoelectric conversion element 18 receives a light beam from the sub mirror 14 and acquires defocusing information of an object. The CCPU 19 receives information from the sensor elements of the focusing photoelectric conversion device 18, and controls, e.g., the operation of the mechanism (not shown) of each portion of the camera in accordance with a predetermined program.

The lens 3 is detachably attached to or fixed to the camera 2. The lens 3 contains a focusing lens driving motor 20 which adjusts the focal point by driving focusing lens groups, an aperture driving motor 21, a zoom encoder 22 which detects the focal length of the lens when a zoom operation is performed, and a lens control microcomputer (to be referred to as an LPU hereinafter) 23 which controls the operations of the focusing lens driving motor 20 and aperture driving motor 21 in accordance with predetermined programs, and receives information from the zoom encoder 22.

Note that the FPU 9, CCPU (information output unit/step, determining unit/step) 19, and LPU 23 are connected by a communication line SC, and exchange data and transmit commands to each other by using the CCPU 19 as a host.

Figure 7:
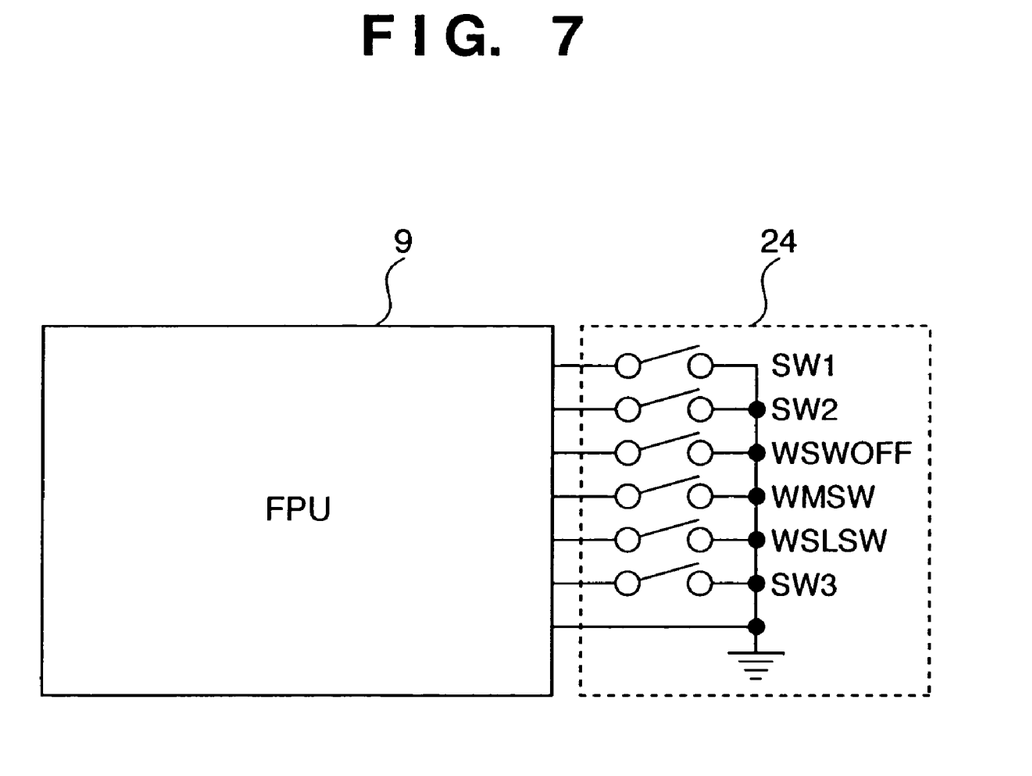
FIG. 7 is a detailed view of a switching circuit.

A switching circuit 24 is connected to the FPU 9 to perform various settings of the stroboscopic device. The details are shown in FIG. 7. Reference numeral 25 denotes a wireless light-receiving circuit. When a switch WSLSW is set to a wireless slave mode, the wireless light-receiving circuit 25 receives a transmission signal from another stroboscopic device, and the FPU 9 controls light emission.

Figure 2:
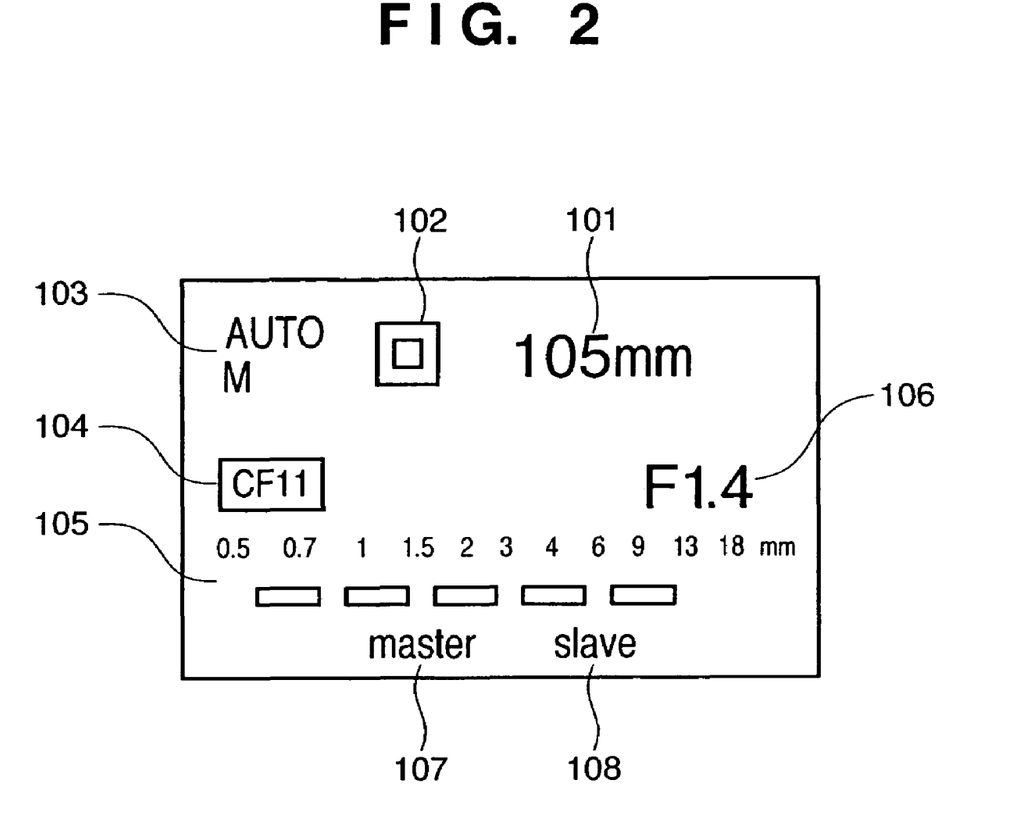
FIG. 2 is a view showing a display example of a display device mounted on the stroboscopic device shown in FIG. 1.

FIG. 2 is a view showing the display contents of the display device 7 of the stroboscopic device 1.

In FIG. 2, reference numeral 101 denotes a 7-segment group having, e.g., 3 digits. The 7-segment group 101 displays focal length information corresponding to an irradiation angle set in the stroboscopic device 1 on the basis of focal length information of the lens. Reference numeral 102 denotes a segment which is turned on on the basis of aperture size information of the camera; and 103, a segment which displays "AUTO" by which the camera 2 automatically operates strobe zoom, and "M" indicating a manual zoom mode in which the zoom position is determined by the strobe alone. Reference numeral 105 denotes a segment which displays bars indicating a coupled range; 106, a segment which displays the aperture value of the lens 3; 107, a display segment which is turned on in a wireless master mode; and 108, a display segment which is turned on in a wireless slave mode.

FIG. 7 is a detailed view of the switching circuit 24.

The switching circuit 24 is connected to the FPU 9, and includes, e.g., a first stroke switch SW1 of a release switch, a second stroke switch SW2 of the release switch, a wireless-off switch WSWOFF, a switch WMSW for setting the wireless master mode, the switch WSLSW for setting the wireless slave mode, and a switch SW3 for canceling a normal mode in which the aperture size information of the camera is input, and the irradiation angle is set on the basis of the focal length information and aperture size information.

When these switches are turned on, the FPU 9 determines that various conditions are set.

Figure 8:
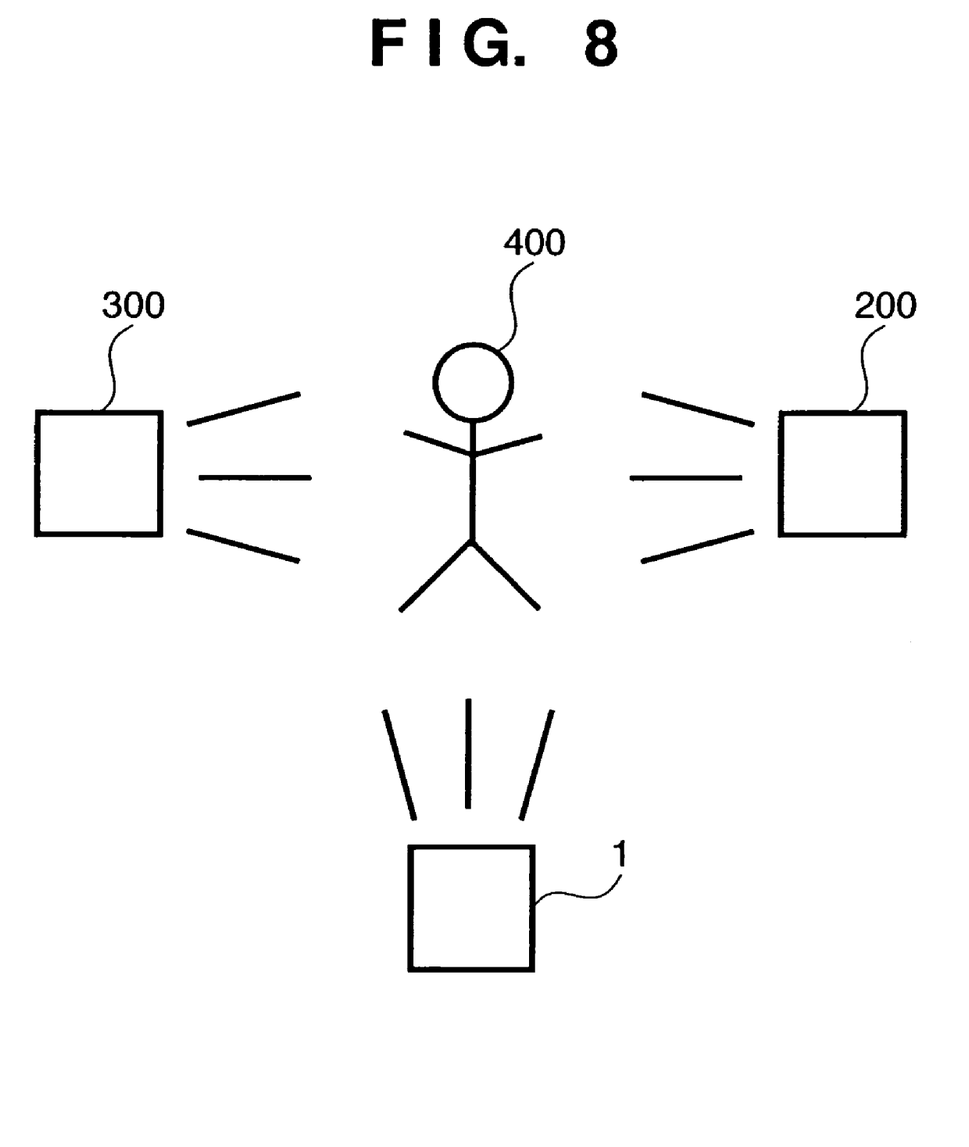
FIG. 8 is a view for explaining a wireless multi-light system.

FIG. 8 is a view showing the system of wireless transmission/reception. In this system, the stroboscopic device 1 attached to the camera is installed as a master strobe, and stroboscopic devices 200 and 300 are installed as slave strobes. Appropriate stroboscopic photography of an object 400 can be performed by adjusting the light amount of each slave strobe by a transmission signal from the master strobe.

[Camera Control]

A practical operation of the CCPU 19 will be explained below with reference to flowcharts shown in FIGS. 3 and 4.

Figure 3:
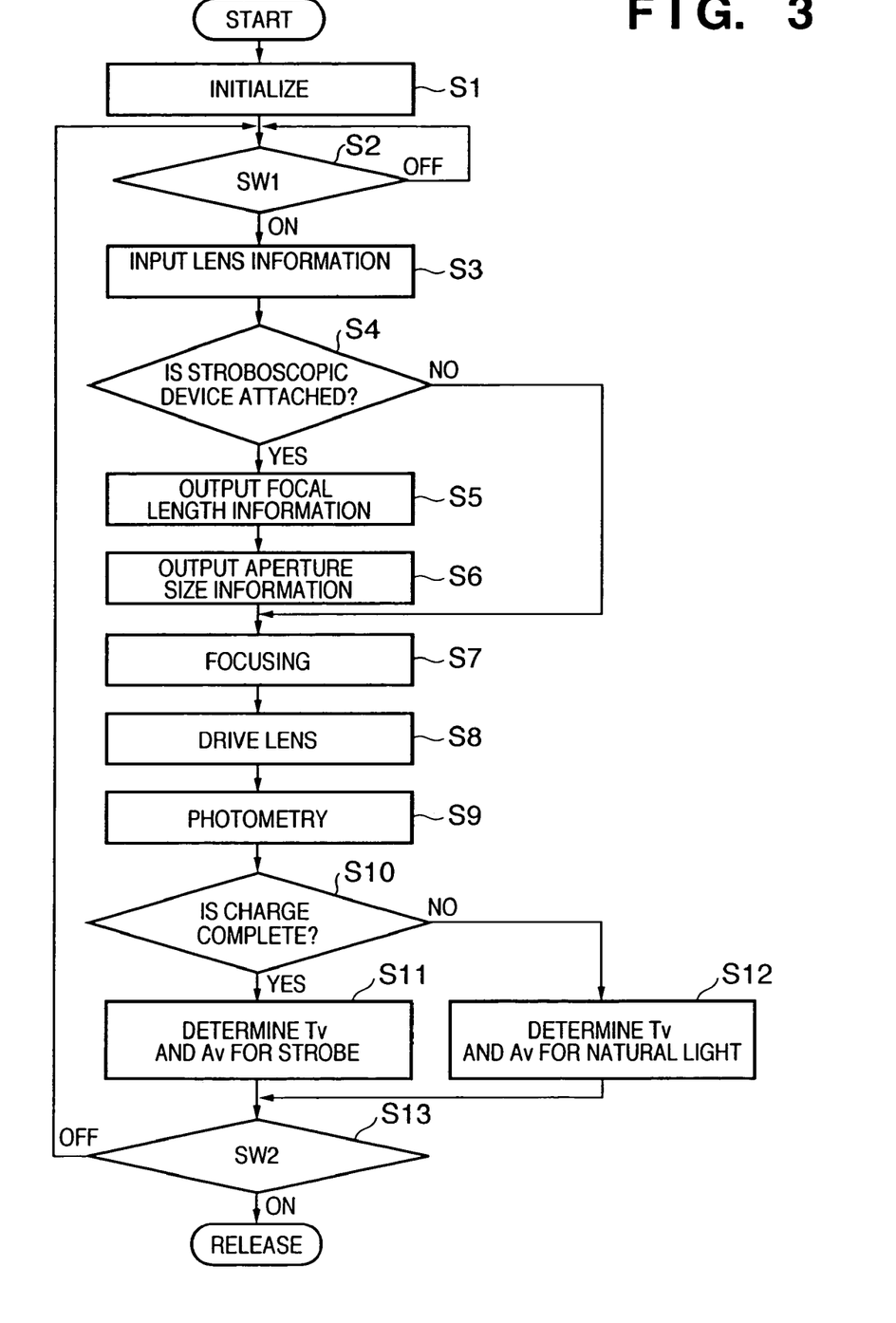
FIG. 3 is a flowchart showing a camera control operation of this embodiment.
Figure 4:
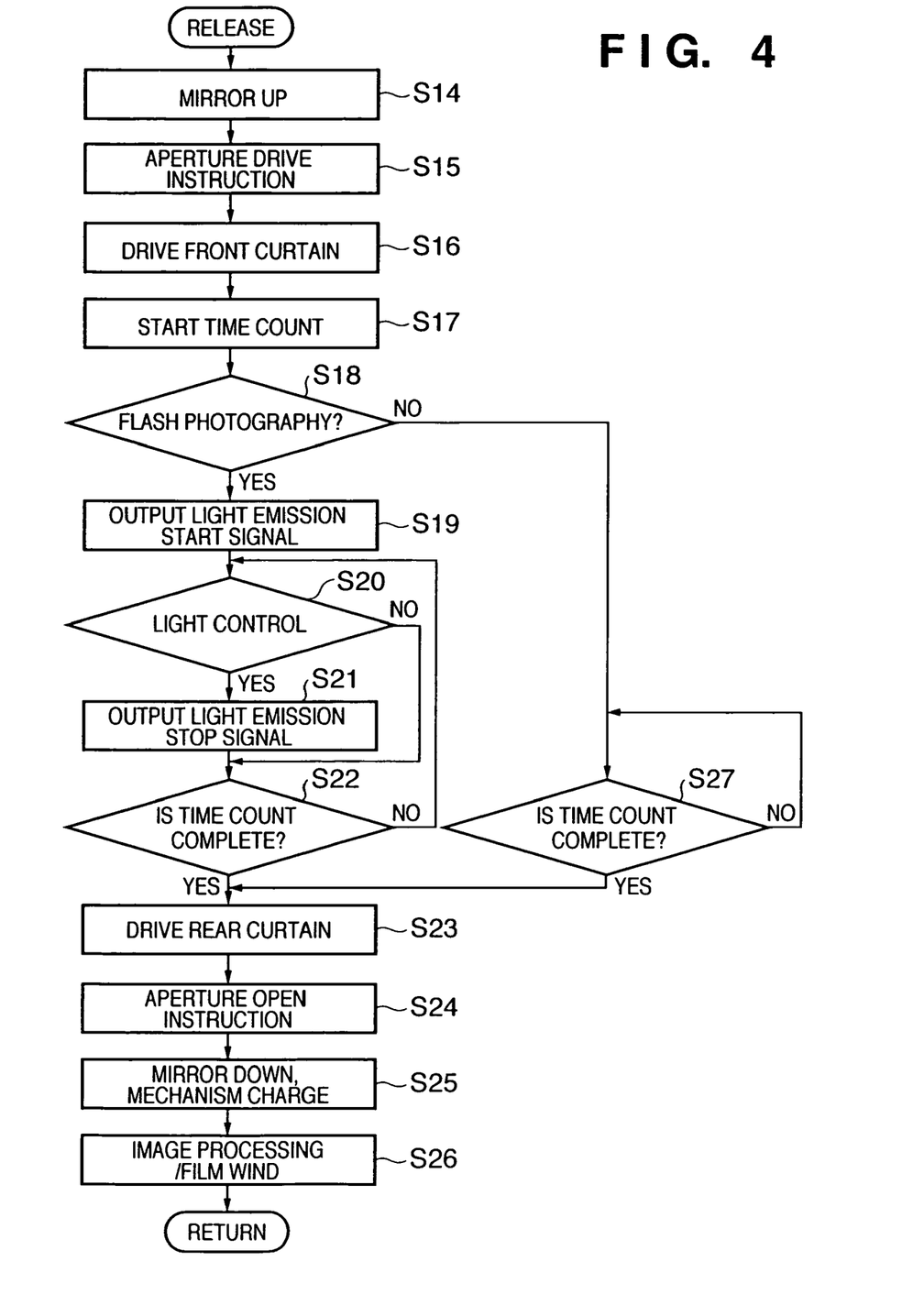
FIG. 4 is a flowchart showing an operation following FIG. 3.

When the power switch (not shown) is turned on to make the CCPU 19 operable, the CCPU 19 starts a predetermined operation from step S1 in FIG. 3.

[Step S1] The CCPU 19 initializes its own memory and ports.

[Step S2] The CCPU 19 waits until the first stroke switch SW1 of the release switch shown in FIG. 7 is turned on. If the first stroke switch SW1 is turned on, the flow advances to step S3.

[Step S3] The CCPU 19 communicates with the LPU 23 via the communication line SC, and acquires focal length information of the lens and optical information necessary for focusing and photometry.

[Step S4 (determining unit/step)] The CCPU 19 checks whether the stroboscopic device 1 as an electric light emission device is attached to the camera 2. If the stroboscopic device 1 is attached to the camera 2, the flow advances to step S5; if not, the flow advances to step S7.

[Step S5 (information output unit/step)] The CCPU 19 communicates with the FPU 9 via the communication line SC, and outputs the focal length information of the lens acquired in step S3 to the FPU 9.

[Step S6 (information output unit/step)] The CCPU 19 communicates with the FPU 9 via the communication line SC, and outputs aperture size information of the camera stored in the memory of the CCPU 19 to the FPU 9. The aperture size information of the camera is, e.g., magnification data with respect to a film size "135 size" (a format having a frame size of 36×24 mm).

[Step S7] The CCPU 19 receives a focusing signal from the focusing photoelectric conversion device 18, and acquires defocus information of an object.

[Step S8] The CCPU 19 calculates a lens driving amount on the basis of the defocus information of the object acquired in step S7, and outputs the calculated lens driving amount to the LPU 23, thereby commanding the LPU 23 to drive the focusing lens. This sets the lens in an in-focus state.

[Step S9] The CCPU 19 receives a photometric output from the photoelectric conversion device 15 in order to obtain luminance information of the object.

[Step S10] The CCPU 19 checks whether the FPU 9 has output a charge completion signal. If the FPU 9 has output the charge completion signal, the flow advances to step S11; if not, the flow advances to step S12. Note that the result of this determination in step S10 of whether the FPU 9 has output the charge completion signal is stored because it is necessary in a subsequent step.

[Step S11] The CCPU 19 determines a shutter speed (Tv) and aperture value (Av) suited for stroboscopic photography on the basis of the photometric output obtained in step S9.

[Step S12] The CCPU 19 determines a shutter speed (Tv) and aperture value (Av) suited for natural light photography on the basis of the photometric output obtained in step S9.

When the processing in step S11 or S12 is executed, the flow advances to step S13.

[Step S13] The CCPU 19 checks whether the second stroke switch SW2 of the release switch shown in FIG. 7 is ON. If the second stroke switch SW2 is OFF, the flow returns to step S2, and the CCPU 19 repeats the above steps. If the second stroke switch SW2 is ON, the flow advances to step S14 shown in FIG. 4.

[Step S14] The CCPU 19 drives a motor (not shown) to move up the main mirror 13 and sub mirror 14.

[Step S15] The CCPU 19 outputs information of the aperture value determined in step S11 or S12 to the LPU 23 via the communication line SC, and commands the LPU 23 to drive the aperture stop. In this manner, a stopping-down operation is performed.

[Step S16] The CCPU 19 drives the front curtain of the shutter to start exposure.

[Step S17] The CCPU 19 starts counting the open/close time of the shutter on the basis of information of the shutter speed determined in step S11 or S12.

[Step S18] On the basis of the determination result stored in step S10, the CCPU 19 checks whether the FPU 9 has output a charge completion signal. If the FPU 9 has output the charge completion signal, the flow advances to step S19. If it is determined in step S18 that the FPU 19 has not output the charge completion signal, the flow advances from step S18 to step S27.

[Step S19] The CCPU 19 outputs a strobe light emission start signal to the FPU 9 via the communication line SC, thereby starting strobe light emission.

[Step S20] The CCPU 19 performs a light control operation. More specifically, the CCPU 19 monitors the output signal from the photoelectric conversion device 17 in order to obtain light amount information of the film surface 16, and thereby checks whether the strobe light emission amount has reached a sufficient level. If the strobe light emission amount has reached the sufficient level, the flow advances to step S21.

[Step S21] The CCPU 19 outputs a strobe light emission stop signal to the FPU 9 via the communication line SC. As a consequence, the strobe light emission stops. If it is determined in step S20 that the strobe light emission amount has not reached the sufficient level, the flow advances to step S22 without executing the processing in step S21.

[Step S22] The CCPU 19 checks whether the count of the shutter open/close time started in step S17 is complete. If this time count is complete, the flow advances to step S23; if not, the flow returns to step S20, and the CCPU 19 repeats the above steps.

[Step S23] The CCPU 19 drives the rear curtain of the shutter to terminate the exposure.

[Step S24] The CCPU 19 communicates with the LPU 23 via the communication line SC, and commands the LPU 23 to open the aperture stop.

[Step S25] The CCPU 19 drives the motor (not shown) to move down the main mirror 13 and sub mirror 14, and charges the shutter.

[Step S26] The CCPU 19 drives a motor (not shown) to wind up the film.

After that, the flow returns to step S1 of FIG. 3, and the CCPU 19 repeats the above steps.

[Step S27] The CCPU 19 checks whether the count of the shutter open/close time started in step S17 is complete. If this time count is complete, the flow advances to step S23; if not, the CCPU 19 waits until the count is complete.

Although the above process is the operation of a film camera, the same process is similarly applicable even when a digital image sensing device (CCD, CMOS) is used instead of a film. In this case, a sensed image is processed instead of the winding operation performed by the motor in step S26.

First Embodiment

The operation of the FPU 9 of the first embodiment will be described below with reference to a flowchart shown in FIG. 5A.

When the power switch (not shown) is turned on to make the FPU 9 operable, the FPU 9 starts a predetermined operation from step S101.

[Step S101] The FPU 9 initializes its own memory and ports. As will be described later, as the aperture size information (magnification information) and the focal length information of the lens to be acquired from the CCPU 19 and stored in its own memory, the FPU 9 stores default values, e.g., ×1 of the 135 size as the aperture size information, and 50 mm as the focal length information of the lens.

[Step S102] The FPU 9 prepares for light emission by allowing the boosting circuit 6 to start operating.

[Step S103 (information input unit/step)] The FPU 9 checks whether the focal length information of the photographing lens is acquired from the CCPU 19 via the communication line SC. If the focal length information of the photographing lens is acquired, the flow advances to step S104.

If in step S103 the focal length information of the photographing lens is not acquired, the flow advances to step S106 without performing processes in steps S104 and S105.

[Step S104] The FPU 9 stores, in its own memory, the focal length information of the photographing lens transmitted from the CCPU 19. If the focal length information of the photographing lens is already stored in its own memory before that, the FPU 9 updates the stored contents.

[Step S105 (display unit/step)] The FPU 9 displays, on the display device 7, the focal length information of the photographing lens stored in its own memory. In this case, the FPU 9 displays the focal length information 101 shown in FIG. 2. Also, the FPU 9 does not drive the irradiation angle adjusting motor 8 (does not perform any zoom operation).

[Step S106] The FPU 9 checks whether the aperture size information (magnification information) of the camera is transmitted from the CCPU 19 via the communication line SC. If the aperture size information (magnification information) of the camera is transmitted, the flow advances to step S107. If the frame size information of the camera is not transmitted in step S106, the flow advances to step S109 without performing processes in steps S107 and S108.

[Step S107] The FPU 9 stores, in its own memory, the aperture size information (magnification information) transmitted from the CCPU 19. If the aperture size information (magnification information) is already stored in its own memory before that, the FPU 9 updates the stored contents.

[Step S108 (display unit/step)] The FPU 9 displays, on the display device 7, the aperture size information stored in its own memory. In this case, if the aperture size information is other than ×1, the FPU 9 shows that a zoom operation corresponding to the aperture size is being performed, as indicated by 102 in FIG. 2 (mark lighting).

[Step S109] The FPU 9 selects an optimum strobe irradiation angle position on the basis of the aperture size information of the camera and the focal length information of the photographing lens stored in its own memory. An example of the method of selecting the strobe irradiation angle position is the following calculation method performed by the FPU 9.

Assume that seven positions can be selected as the strobe irradiation angle position, in "position 1" the irradiation angle covers the angle of view of a 24-mm lens of "135 size", in "position 2" the irradiation angle covers the angle of view of a 28-mm lens of "135 size", in "position 3" the irradiation angle covers the angle of view of a 35-mm lens of "135 size", in "position 4" the irradiation angle covers the angle of view of a 50-mm lens of "135 size", in "position 5" the irradiation angle covers the angle of view of a 70-mm lens of "135 size", in "position 6" the irradiation angle covers the angle of view of an 80-mm lens of "135 size", and in "position 7" the irradiation angle covers the angle of view of a 105-mm lens of "135 size". In this case, the FPU 9 calculates a magnification and lens focal length corresponding to the reference aperture size, and determines an irradiation angle position to be selected.

If the result of focal length×magnification is intermediate between the lens focal lengths of the 135 size, a wider angle is selected.

For example, when 24 mm of the 135 size is selected as the lens focal length and ×1.6 is transmitted as the aperture size information (magnification information), the calculation result is 38.4 which is intermediate between 35 mm of the 135 size and 50 mm of the 135 size. In this case, 35 mm as a wider angle is selected.

By the above calculation, an optimum strobe irradiation angle position can be selected on the basis of the aperture size information (magnification information) and the focal length information of the photographing lens.

The coupled range may also be indicated by bars, as indicated by 105 in FIG. 2, in accordance with a guide number corresponding to the determined strobe irradiation angle.

[Step S110] The FPU 9 drives the irradiation angle adjusting motor 8 so that the irradiation angle of the strobe changes to the irradiation angle position selected in step S109.

[Step S111] The FPU 9 determines whether the boosted voltage has reached a voltage level necessary for the luminous element 5 to emit light. If it is determined that the voltage level necessary for light emission of the luminous element 5 is reached, the flow advances to step S112.

If it is determined in step S111 that the voltage boosted by the boosting circuit 6 has not reached the voltage level necessary for light emission of the luminous element 5, the flow advances to step S118.

[Step S112] The FPU 9 outputs a charge completion signal to notify the CCPU 19 that strobe light emission is prepared.

[Step S113] The FPU 9 checks whether a light emission start signal is output from the CCPU 19. If no light emission start signal is output, the flow returns to step S102, and the FPU 9 repeats the above steps. If the light emission start signal is output, the flow advances to step S114.

[Step S114] The FPU 9 supplies a trigger signal to a light emission start element (not shown) to start strobe light emission.

[Step S115] The FPU 9 checks whether a light emission stop signal is output from the CCPU 19. If no light emission stop signal is output, the flow advances to step S116. If the light emission stop signal is detected in step S115, the flow advances to step S117.

[Step S116] The FPU 9 checks whether the strobe has emitted a maximum light amount. If the strobe has not emitted the maximum light amount, the flow returns to step S115, and the FPU 9 repeats the above step. If the strobe has emitted the maximum light amount, the flow advances to step S117.

[Step S117] The FPU 9 supplies a trigger signal to a light emission stop element (not shown) to stop the strobe light emission. After that, the flow returns to step S102, and the FPU 9 repeats the above steps.

[Step S118] The FPU 9 outputs a charge signal indicating that the battery is being charged, and thereby notifies the CCPU 19 that strobe light emission is not prepared.

After that, the flow advances to step S102, and the FPU 9 repeats the above steps.

In the first embodiment described above, the focal length and the camera aperture size information indicating a magnification with respect to the reference aperture size are transmitted from the camera to the stroboscopic device. Therefore, even when the number of variable steps of the irradiation angle of strobe light increases, calculations for conversion into the light distribution angle are performed simply and rapidly. This improves the conventional drawback that the process of conversion from the focal length and image size into the light distribution angle performed by the internal arithmetic device of the strobe is complicated.

Also, the strobe light irradiation angle can be changed step by step on the basis of the focal length information and aperture size information. This obviates the need for a complicated mechanism as disclosed in Japanese Patent Laid-Open No. 5-313230 described earlier. Consequently, variable control of the strobe light irradiation angle can be simplified and performed at a high speed.

In addition, if the product of focal length×magnification is in the middle of the reference focal length range, the irradiation angle is set to a wider angle. Therefore, in a case except for a communication failure as described in Japanese Patent Laid-Open No. 5-11315, the strobe light irradiation angle is set at an angle wider than the actual calculated value. This effectively eliminates insufficient light distribution.

Furthermore, the display device which displays the focal length information allows a user to visually recognize that there is no difference from the actual focal length of the photographing lens. This makes it possible to avoid an event in which, e.g., the user gets confused.

Second Embodiment

In the second embodiment explained below, a photographer can select, by a custom function (CF), a first mode in which the irradiation angle of irradiating light of strobe light is controlled on the basis of the photographing lens focal length information and aperture size information acquired from the camera, and a second mode in which the irradiation angle of strobe light is controlled on the basis of only the focal length information.

Figure 5A:
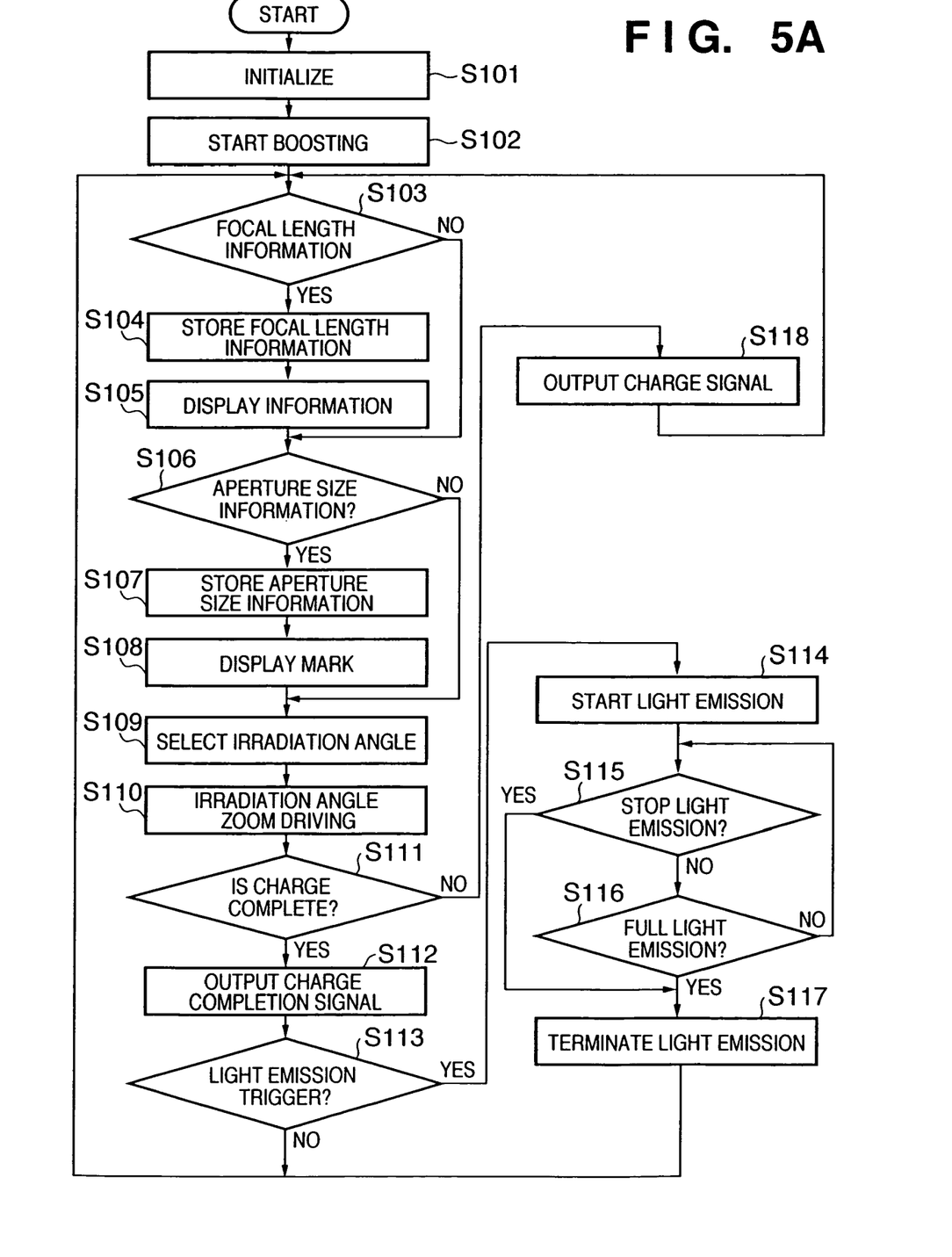
FIG. 5A is a flowchart showing a strobe control operation of the first embodiment.
Figure 5B:
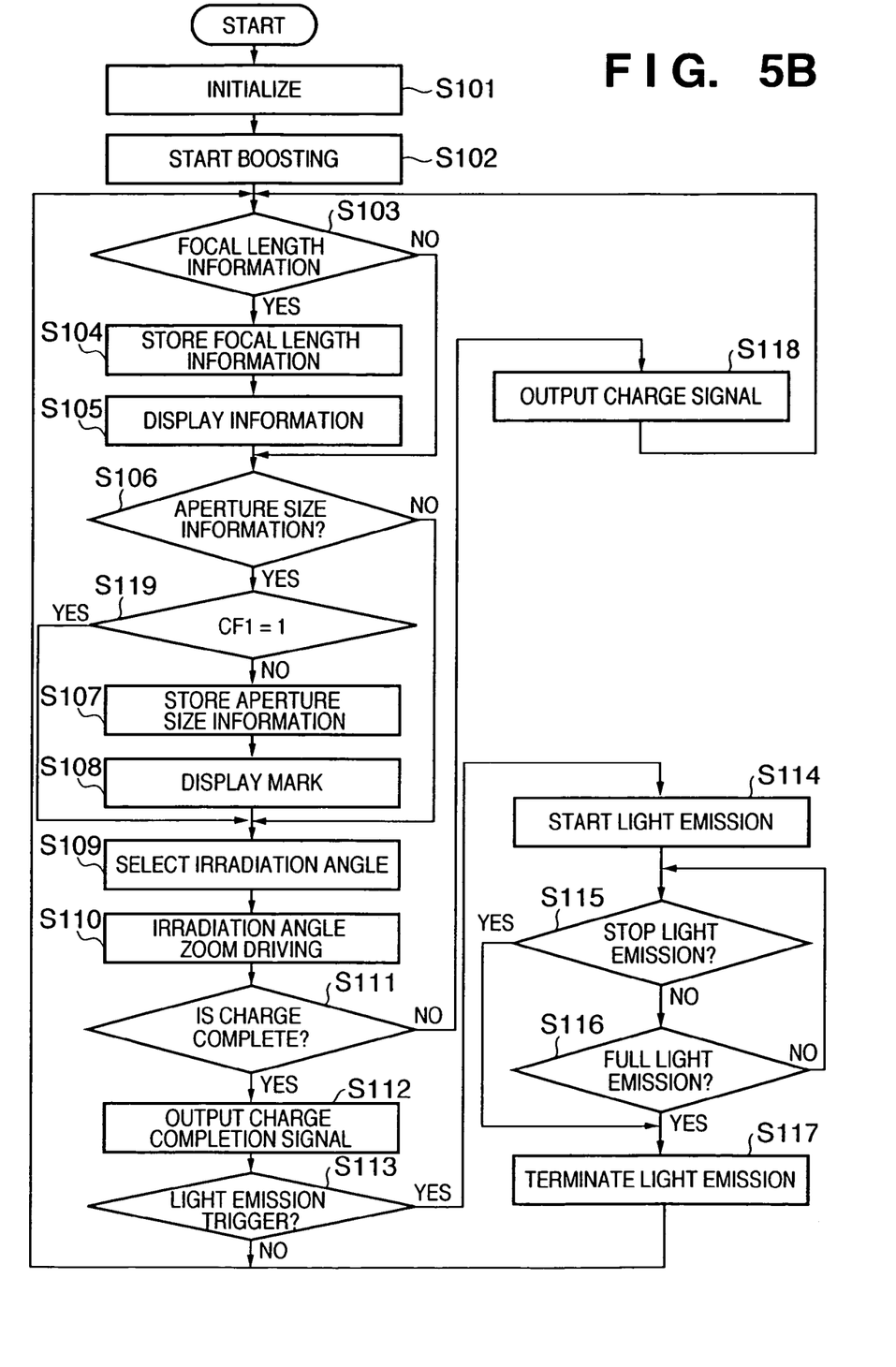
FIG. 5B is a flowchart showing a strobe control operation of the second embodiment.

The same reference numerals as in the flowchart of FIG. 5A denote steps having the same operations in FIG. 5B, and an explanation thereof will be omitted.

FIG. 5B differs from the flowchart shown in FIG. 5A in that step S119 is added between steps S106 and S107.

[Step S106] The FPU 9 checks whether the aperture size information (magnification information) of the camera is transmitted from the CCPU 19 via the communication line SC. If the aperture size information (magnification information) of the camera is transmitted, the flow advances to step S119. If the frame size information of the camera is not transmitted in step S106, the flow advances to step S109 without performing processing in step S107.

[Step S119 (control unit/step)] The FPU 9 determines whether the custom function (CF) is set. If the first mode is selected (CF1=1), the flow advances to step S107. If the second mode is selected, the flow advances to step S109. After that, the FPU 9 executes processing from step S107. The custom function will be explained below.

By using a method of storing various settings and mode conditions of the stroboscopic device 1 in accordance with the taste of a photographer, the photographer can select the two modes described above by the custom function.

As indicated by 104 of FIG. 2 which shows the display contents of the display device 7 of the stroboscopic device 1, a first setting mode and second setting mode can be selected when "CF1" is set to 0 and 1, respectively, by a switch operation unit (not shown) of the stroboscopic device 1. The set mode is stored in the EEPROM 10 which keeps storing data even when the power supply is turned off. Note that the custom function setting can be stored in either the EEPROM 10 or a built-in EEPROM of the FPU 9.

Note that the calculations of the focal length information and magnification information may also be prepared in the form of a lookup table, instead of the focal length calculation in step S109. If the number of variable steps of the strobe irradiation angle is small, the focal length and the camera aperture size information indicating a magnification with respect to the reference aperture size are transmitted from the camera to the stroboscopic device. This further simplifies the calculation of conversion into the light distribution angle.

That is, calculated values using the focal length information and aperture size information are obtained beforehand on the basis of the lookup table. Therefore, if, for example, the number of variable steps of the strobe irradiation angle is small, the calculation of conversion into the light distribution angle is performed more simply and rapidly. Consequently, it is possible to eliminate the conventional drawback that the process of conversion from the focal length and image size into the light distribution angle in the internal arithmetic unit of the strobe is complicated.

In the second embodiment described above, a photographer selects, as the custom function by using the switch, the first setting mode in which the irradiation angle of irradiating light of strobe light is controlled on the basis of the focal length information and aperture size information acquired from the camera, and the second setting mode in which the irradiation angle of strobe light is controlled on the basis of only the focal length information. Accordingly, the photographer can select a strobe light irradiation angle corresponding to the aperture size information, and a strobe light irradiation angle based only on the focal length information.

Also, if the magnification is ×1 or more, the stroboscopic device automatically emits light at a light distribution angle wider than the zoom position of a lens focal length corresponding to the aperture size information. This effectively allows the photographer to select light distribution having a margin with respect to the aperture size. In addition, a wide angle is automatically set even when the photographer wants to select light distribution having a margin with respect to the aperture size in advance. This saves the photographer the trouble of setting a selectable strobe irradiation angle in accordance with the lens focal length before photography, i.e., saves the photographer the trouble of manually setting the light distribution angle, unlike in Japanese Patent Laid-Open No. 6-11760.

Third Embodiment

In the third embodiment described below, it is possible to select a normal mode in which the irradiation angle of strobe light is set to an optimum value on the basis of the photographing lens focal length information and camera aperture size information input from the camera, and a slave mode in which light emission is controlled on the basis of a command from the master strobe. In the slave mode, the strobe light is set at a predetermined irradiation angle by inhibiting the normal mode.

Figure 6A:
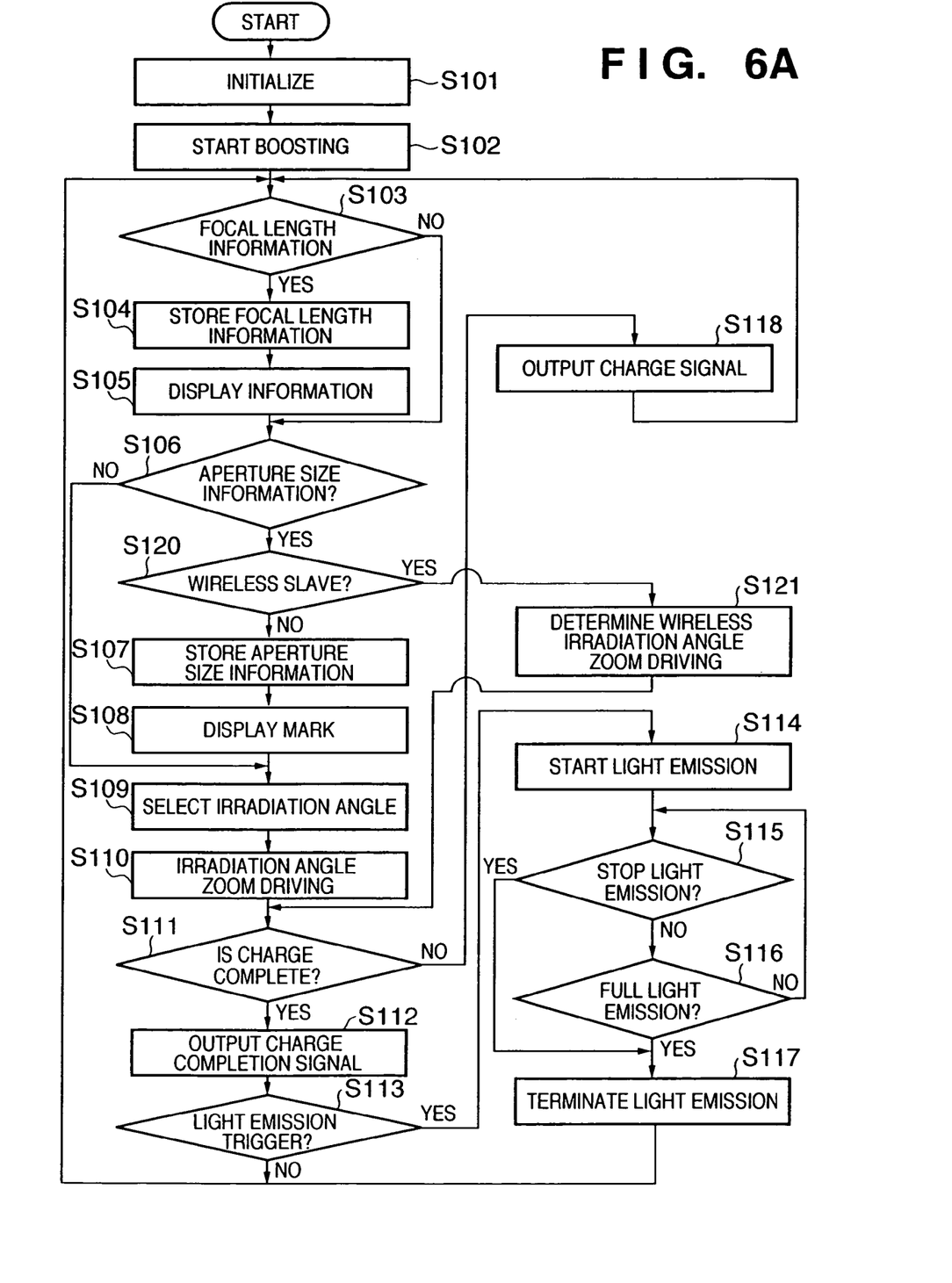
FIG. 6A is a flowchart showing a strobe control operation of the third embodiment.

The same reference numerals as in the flowchart of FIG. 5A denote steps having the same operations in FIG. 6A, and an explanation thereof will be omitted.

FIG. 6A differs from FIG. 5A in that steps S120 and S121 are added.

[Step S120 (control unit/step)] The FPU 9 determines whether the switch WSLSW shown in FIG. 7 is turned on to set the wireless slave mode. In the normal mode in which the switch WSLSW is OFF, the flow advances to step S107. In the wireless slave mode in which the switch WSLSW is ON, the flow advances to step S121.

[Step S121 (control unit/step)] The FPU 9 sets a strobe irradiation angle corresponding to a default focal length in the wireless slave mode. For example, 24 mm as a wide angle is set. After that, the flow advances to step S111.

In the third embodiment described above, it is possible to select the normal mode in which the irradiation angle of strobe light is set to an optimum value on the basis of the photographing lens focal length information and camera aperture size information input from the camera, and the slave mode in which light emission is controlled on the basis of a command from the master strobe. In the slave mode, the strobe light is set at a predetermined irradiation angle by inhibiting the normal mode. Therefore, it is possible to eliminate the drawback that when the master strobe is detached from the camera and used as a slave strobe, the last settings cannot be canceled, and the photographer cannot set any intended light distribution angle because the last-set irradiation angle remains.

Fourth Embodiment

In the fourth embodiment described below, the irradiation angle of irradiating light of strobe light is controlled on the basis of only the focal length information so that the light distribution angle matches the reference aperture size in an energy saving mode.

In the energy saving mode (SE mode), no operating mechanism is operated after the elapse of a predetermined time, or, if no communication is performed between the camera and strobe, a microcomputer performs control such that a minimum necessary electric current is consumed in order to prevent waste of the battery. For example, a constant-voltage circuit is shut down, or the clock operation of the microcomputer is stopped.

Figure 6B:
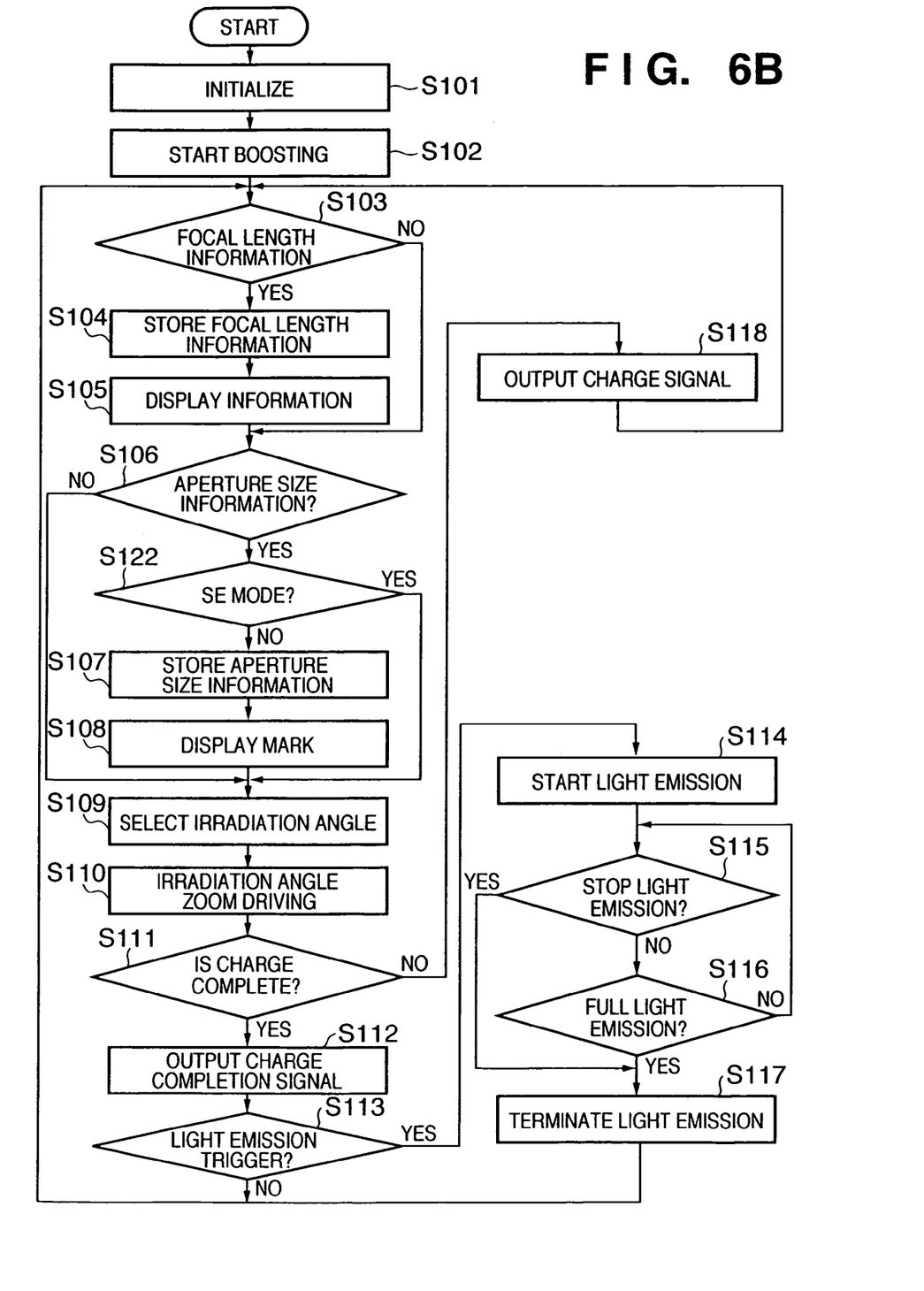
FIG. 6B is a flowchart showing a strobe control operation of the fourth embodiment.

The same reference numerals as in the flowchart of FIG. 6A denote steps having the same operations in FIG. 6B, and an explanation thereof will be omitted.

FIG. 6B differs from the flow chart shown in FIG. 6A in that step S120 is replaced with step S122, and step S121 is omitted.

[Step S106] The FPU 9 checks whether the aperture size information (magnification information) of the camera is transmitted from the CCPU 19 via the communication line SC. If the aperture size information (magnification information) of the camera is transmitted, the flow advances to step S122. If the frame size information of the camera is not transmitted in step S106, the flow advances to step S109 without performing processing in step S122.

[Step S122 (control unit/step)] The FPU 9 determines whether the energy saving mode (SE mode) is set. If the energy saving mode is not set, the flow advances to step S107. If the SE mode is set, the flow advances to step S109. After that, processing from step S107 is executed.

Note that the calculations of the focal length information and magnification information may also be prepared in the form of a lookup table, instead of the focal length calculation in step S109. If the number of variable steps of the strobe irradiation angle is small, the focal length and the camera aperture size information indicating a magnification with respect to the reference aperture size-are transmitted from the camera to the stroboscopic device. This further simplifies the calculation of conversion into the light distribution angle.

That is, calculated values using the focal length information and aperture size information are obtained beforehand on the basis of the lookup table. Therefore, if, for example, the number of variable steps of the strobe irradiation angle is small, the calculation of conversion into the light distribution angle is performed more simply and rapidly. Consequently, it is possible to eliminate the conventional drawback that the process of conversion from the focal length and image size into the light distribution angle in the internal arithmetic unit of the strobe is complicated.

In the fourth embodiment described above, the same effects as in the first embodiment are obtained even in the energy saving mode.

Note that the object of the present invention can also be achieved by supplying a storage medium (or recording medium) recording program codes of software which implements the functions of the above embodiments to a system or apparatus, and reading out and executing the program codes stored in the storage medium by a computer (or a CPU or MPU) of the system or apparatus.

When the present invention is applied to this storage medium, the storage medium stores control programs for executing the processes of the flowcharts shown in FIGS. 3 to 6B and various tables. These program codes can also be provided as updatable firmware.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-099728 filed on Mar. 30, 2004 and 2004-099729 filed on Mar. 30, 2004, which are hereby incorporated by reference herein.

What is claimed is:

1. A camera system including a stroboscopic device and camera, wherein
said camera comprises information output unit which outputs, to said stroboscopic device, focal length information indicating a focal length of a photographing lens, and size information indicating a magnification with respect to a reference size of an exposure surface of an image sensing element, and
said stroboscopic device comprises:
an irradiation angle changing unit which changes any one of a plurality of irradiation angles of strobe light, the plurality of irradiation angles corresponding to a multiplication value of the focal length and the magnification;
an information input unit which receives the focal length information and size information from said camera; and
a control unit which sets the irradiation angle to a corresponding angle to the multiplication value when the multiplication value obtained based on the focal length information and the size information input from said information input unit is a corresponding multiplication value to any one of the plurality of irradiation angles and sets the irradiation angle to a corresponding angle which is the nearest to and smaller than a non-corresponding multiplication value among the corresponding multiplication values when the multiplication value obtained based on the focal length information and the size information input from said information input unit is not the corresponding multiplication value to any one of the plurality of irradiation angles.

2. A stroboscopic device attachable to a camera, comprising:
an irradiation angle changing unit which changes any one of a plurality of irradiation angles of strobe light, the plurality of irradiation angles corresponding to a multiplication value of the focal length and the magnification;
an information input unit which receives, from a camera to which the stroboscopic device is attached, focal length information indicating a focal length of a photographing lens of the camera, and size information indicating a magnification with respect to a reference size of an exposure surface of an image sensing element; and
a control unit which sets the irradiation angle to a corresponding angle to the multiplication value when the multiplication value obtained based on the focal length information and the size information input from said information input unit is a corresponding multiplication value to any one of the plurality of irradiation angles and sets the irradiation angle to a corresponding angle to the multiplication value which is the nearest to and smaller than a non-corresponding multiplication value among the corresponding multiplication values when the multiplication value obtained based on the focal length information and the size information input from said information input unit is not the corresponding multiplication value to any one of the plurality of irradiation angles.

3. The device according to claim 2, further comprising switching unit which switches a first mode in which said control unit controls the irradiation angle of irradiating light of strobe light on the basis of the focal length information and size information, and a second mode in which said control unit controls the irradiation angle of the strobe light on the basis of only the focal length information.

4. The device according to claim 2, further comprising display unit which displays the focal length information.

5. A method of controlling a camera system including a stroboscopic device and camera, wherein the camera comprises an information output step of outputting, to the stroboscopic device, focal length information indicating a focal length of a photographing lens, and size information indicating a magnification with respect to a reference size of an exposure surface of an image sensing element, and the stroboscopic device including irradiation angle changing unit which changes any one of a plurality of irradiation angles of strobe light, the plurality of irradiation angles corresponding to a multiplication value of the focal length and the magnification, comprises:

an information input step of receiving the focal length information and size information from the camera; and a control step of setting the irradiation angle to a corresponding angle to the multiplication value when the multiplication value obtained based on the focal length information and the size information input from said information input unit is a corresponding multiplication value to any one of the plurality of irradiation angles and sets the irradiation angle to a corresponding angle to the multiplication value which is the nearest to and smaller than a non-corresponding multiplication value among the corresponding multiplication values when the multiplication value obtained based on the focal length information and the size information input from said information input unit is not the corresponding multiplication value to any one of the plurality of irradiation angles.

6. A method of controlling a stroboscopic device having irradiation angle changing unit which changes any one of a plurality of irradiation angles of strobe light, comprising:

an information input step of receiving, from a camera to which the stroboscopic device is attached, focal length information indicating a focal length of a photographing lens of the camera, and size information indicating a magnification with respect to a reference size of an exposure surface of an image sensing element, the plurality of irradiation angles corresponding to a multiplication value of the focal length and the magnification; and a control step of setting the irradiation angle to a corresponding angle to the multiplication value when the multiplication value obtained based on the focal length information and the size information input from said information input unit is a corresponding multiplication value to any one of the plurality of irradiation angles and sets the irradiation angle to a corresponding angle to the multiplication value which is the nearest to and smaller than a non-corresponding multiplication value among the corresponding multiplication values when the multiplication value obtained based on the focal length information and the size information input from said information input unit is not the corresponding multiplication value to any one of the plurality of irradiation angles.

7. The method according to claim 6, further comprising a switching step of switching a first mode in which the control unit controls the irradiation angle of irradiating light of strobe light on the basis of the focal length information and size information, and a second mode in which the control unit controls the irradiation angle of the strobe light on the basis of only the focal length information.

8. The method according to claim 6, further comprising a display step of displaying the focal length information.

* * * * *